J. Smith,
Saw.
No. 108,059.        Patented Oct. 4, 1870.

WITNESSES: Wm. A. Steel, John Parker

John Smith
by his Attr.
Howson and Son

United States Patent Office.

JOHN SMITH, OF PHILADELPHIA, PENNSYLVANIA, ASSIGNOR TO HENRY DISSTON AND HAMILTON DISSTON, OF SAME PLACE.

Letters Patent No. 108,059, dated October 4, 1870.

IMPROVEMENT IN SAWS.

The Schedule referred to in these Letters Patent and making part of the same.

I, JOHN SMITH, of Philadelphia, county of Philadelphia, State of Pennsylvania, have invented an Improvement in Saws and in Detachable Teeth for the same, of which the following is a specification.

Nature and Object of the Invention.

My invention relates to improvements in saw-teeth having curved bases, of such a form that the teeth will jam themselves fast in the blade on pressure being applied to the points; and My invention consists of a projection on the blade so arranged as to be struck by a projecting part of the tooth, thereby limiting the movement of the latter, and preventing the expansion of the blade.

Description of the Accompanying Drawing.

Figure 1:
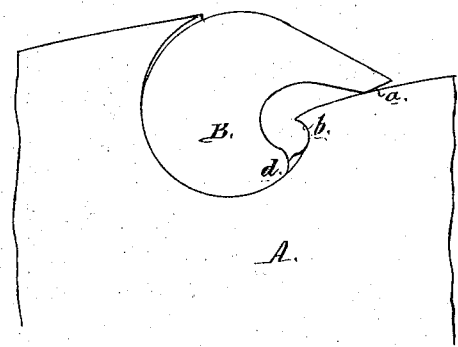

Figure 1 is a side view of my improved detachable tooth as it appears when being introduced to its place in the blade.

Figure 2:
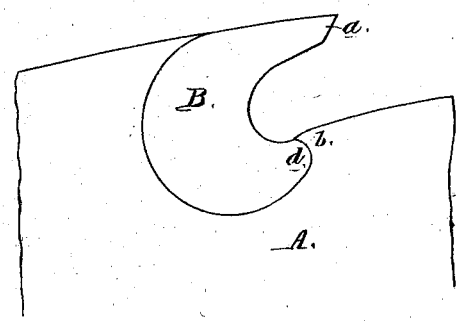

Figure 2, the same, showing the tooth fitted to its place.

General Description.

In figs. 1 and 2, A represents part of the blade, and B, a detachable tooth, the base of the latter, as well as the recess of the blade in which the base fits, being formed on such a curved line that the tooth will jam itself fast in the blade on pressure being applied to the point $a$ of the tooth.

This arrangement of self-binding tooth is shown in the patent granted to James W. Strange, August 13, 1867, reissued to Henry Disston, September 28, 1869.

The defect of this tooth is, that when the saw is in use, constant pressure must necessarily be applied to the point, and the base becomes jammed so tight as to affect, by a wedge-like action, the integrity of the blade, which eventually becomes so much warped that the saw is rendered useless.

In order to prevent this, rivets have been used, but these are also apt to distort the blade.

I have found that the most effective remedy for these defects is the formation of a hooked-like projection or stop, $b$, on the blade in front of the tooth, the front rounded end $d$ of the tooth-base fitting snugly into the concavity of this projection, as shown in fig. 2.

The tooth and its recess are so arranged that when the further backward movement of the tooth is arrested by the projection $b$, the base is sufficiently tight in its recess, but no pressure applied to the point of the tooth can cause the base to move further, or, by a wedge-like action, warp the blade.

Whatever yielding or springing of the tooth there may be, and there is always more or less of this, it only tends to tighten the base in its recess without distorting the blade.

It should be understood that the base of the tooth has a V-shaped groove, adapted to a similarly-shaped rib on the edge of the recess of the blade.

I claim, as an improvement on the saw-tooth patented to J. W. Strange—

The projection $b$ on the blade A, and the projection $d$ on the tooth B, abutting therewith, as described.

In testimony whereof, I have signed my name to this specification in the presence of two subscribing witnesses.

JOHN SMITH.

Witnesses:
 A. H. SHOEMAKER,
 W. J. R. DELANY.